US008443369B1

(12) United States Patent
Bailey et al.

(10) Patent No.: US 8,443,369 B1
(45) Date of Patent: May 14, 2013

(54) METHOD AND SYSTEM FOR DYNAMICALLY SELECTING A BEST RESOURCE FROM EACH RESOURCE COLLECTION BASED ON RESOURCES DEPENDENCIES, PRIOR SELECTIONS AND STATISTICS TO IMPLEMENT AN ALLOCATION POLICY

(75) Inventors: Charles Christopher Bailey, Durham, NC (US); Miles Aram de Forest, Bahama, NC (US); Michael Burriss, Raleigh, NC (US); David Haase, Fuquay Varina, NC (US); Dipak Prasad, Raleigh, NC (US); Brandon Myers, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 1250 days.

(21) Appl. No.: 12/164,959

(22) Filed: Jun. 30, 2008

(51) Int. Cl.
*G06F 9/46* (2006.01)

(52) U.S. Cl.
USPC .......................................................... 718/104

(58) Field of Classification Search .................. 718/104; 705/35
See application file for complete search history.

(56) References Cited

U.S. PATENT DOCUMENTS

| | | | |
|---|---|---|---|
| 5,604,902 A | 2/1997 | Burkes et al. | |
| 6,681,242 B1 * | 1/2004 | Kumar et al. | 718/104 |
| 6,880,062 B1 * | 4/2005 | Ibrahim et al. | 711/202 |
| 7,284,244 B1 * | 10/2007 | Sankaranarayan et al. | 718/104 |
| 7,340,522 B1 | 3/2008 | Basu et al. | |
| 7,406,484 B1 | 7/2008 | Srinivasan et al. | |
| 7,463,648 B1 | 12/2008 | Eppstein et al. | |
| 7,480,912 B2 | 1/2009 | Arnold et al. | |
| 7,849,180 B2 | 12/2010 | Sawyer et al. | |
| 2001/0049779 A1 | 12/2001 | Shimada et al. | |
| 2003/0056073 A1 | 3/2003 | Zeiger | |
| 2003/0131165 A1 | 7/2003 | Asano et al. | |
| 2004/0039891 A1 | 2/2004 | Leung et al. | |
| 2004/0098537 A1 | 5/2004 | Serizawa | |
| 2004/0153606 A1 | 8/2004 | Schott | |
| 2004/0181476 A1 * | 9/2004 | Smith et al. | 705/35 |
| 2004/0243699 A1 | 12/2004 | Koclanes et al. | |
| 2005/0273556 A1 | 12/2005 | Gellai et al. | |
| 2006/0085471 A1 | 4/2006 | Rajan et al. | |

(Continued)

OTHER PUBLICATIONS

Non-Final Official Action for U.S. Appl. No. 12/751,685 (Feb. 14, 2012).

(Continued)

*Primary Examiner* — Thomas Lee
*Assistant Examiner* — Xuxing Chen
(74) *Attorney, Agent, or Firm* — Jenkins, Wilson, Taylor & Hunt, P.A.

(57) ABSTRACT

Systems, methods, and computer readable medium for optimizing storage allocations based on system resources are disclosed. According to one aspect, the subject matter described herein includes a method for dynamic, policy-based allocation of system resources. The method includes specifying a plurality of system resource collections for representing sets of like system resources and their dependencies. An order in which the collections are to be evaluated during selection of a resource is also specified. A policy for determining the best resource within each collection is also specified. Statistics about the system resources in the collections are maintained. A request for a resource is received. In response to receiving the request, the collections are evaluated in the specified order. The best resource is selected from each collection based on the dependencies, prior selections, and statistics to implement the policy.

24 Claims, 3 Drawing Sheets

U.S. PATENT DOCUMENTS

| | | | |
|---|---|---|---|
| 2006/0112247 | A1 | 5/2006 | Ramany et al. |
| 2006/0143424 | A1 | 6/2006 | Matsuzaki |
| 2007/0043842 | A1 | 2/2007 | Chouanard et al. |
| 2007/0143563 | A1 | 6/2007 | Pudipeddi et al. |
| 2007/0185934 | A1 | 8/2007 | Cannon et al. |
| 2008/0082593 | A1 | 4/2008 | Komarov et al. |
| 2009/0064159 | A1* | 3/2009 | LaFrese et al. ............... 718/104 |
| 2009/0077327 | A1 | 3/2009 | Hara |
| 2009/0089516 | A1 | 4/2009 | Pelts et al. |
| 2009/0276588 | A1 | 11/2009 | Murase |
| 2010/0153641 | A1 | 6/2010 | Jagadish et al. |
| 2010/0262802 | A1 | 10/2010 | Goebel et al. |
| 2010/0299495 | A1 | 11/2010 | Frank |
| 2011/0191536 | A1 | 8/2011 | Mizuno et al. |

OTHER PUBLICATIONS

Non-Final Official Action for U.S. Appl. No. 12/100,514 (Jan. 31, 2012).

Commonly Assigned, Co-pending U.S. Appl. No. 13/168,329 for "Methods, Systems, and Computer Readable Medium for Controlling Prioritization of Tiering and Spin Down Features in a Data Storage System" (Unpublished, filed Jun. 24, 2011).

Final Official Action for U.S. Appl. No. 12/100,514 (May 25, 2011).

Non-Final Official Action for U.S. Appl. No. 12/100,514 (Nov. 16, 2010).

Commonly-assigned, Co-pending U.S. Appl. No. 12/826,434 for "Managing Multi-Tiered Storage Pool Provisioning," (Unpublished, filed Jun. 29, 2010).

Commonly Assigned, Co-pending U.S. Appl. No. 12/826,385 for "Systems, Methods, and Computer Readable Media for Compressing Data at a Virtually Provisioned Storage Entity" (Unpublished, Filed Jun. 29, 2010).

Commonly Assigned, Co-pending U.S. Appl. No. 12/824,816 for "Methods, Systems, and Computer Readable Medium for Tier-Based Data Storage Resource Allocation and Data Relocation in a Data Storage Array" (Unpublished, filed Jun. 28, 2010).

Commonly Assigned, Co-pending U.S. Appl. No. 12/751,685 for "Systems, Methods, and Computer Readable Media for an Adaptive Block Allocation Mechanism" (Unpublished, filed Mar. 31, 2010).

Commonly Assigned, Co-pending U.S. Appl. No. 12/100,514 for "Methods, Systems, and Computer Readable Medium for Allocating Physical Storage in a Storage Array" (Unpublished, filed Apr. 10, 2008).

Non-Final Official Action for U.S. Appl. No. 12/824,816 (Sep. 14, 2012).

Interview Summary for U.S. Appl. No. 12/751,665 (Aug. 20, 2012).

Final Official Action for U.S. Appl. No. 12/100,514 (Aug. 10, 2012).

Final Official Action for U.S. Appl. No. 12/751,685 (Jun. 27, 2012).

Non-Final Official Action for U.S. Appl. No. 12/826,434 (Jun. 13, 2012).

Applicant-Initiated Interview Summary for U.S. Appl. No. 12/100,514 (Jun. 5, 2012).

Non-Final Official Action for U.S. Appl. No. 12/751,665 (May 8, 2012).

Notice of Allowance and Fee(s) Due for U.S. Appl. No. 12/751,665 (Nov. 16, 2012).

* cited by examiner

METHOD AND SYSTEM FOR DYNAMICALLY SELECTING A BEST RESOURCE FROM EACH RESOURCE COLLECTION BASED ON RESOURCES DEPENDENCIES, PRIOR SELECTIONS AND STATISTICS TO IMPLEMENT AN ALLOCATION POLICY

TECHNICAL FIELD

The subject matter described herein relates to the intelligent allocation of finite system resources. More particularly, the subject matter described herein relates to methods, systems, and computer readable medium for dynamic, policy-based allocation of system resources.

BACKGROUND

Systems that manage large numbers or amounts of resources often must impose organizational structures onto the collection of resources in order to manage the collection in a rational way. Preferably, the organization is along natural boundaries that consider real, physical characteristics and constraints of the collection and its individual components. The difficulties of managing large and complex collections of resources may be mitigated via the use of high level abstractions to represent, in simplified form, certain aspects of the system, the collections or resources, and the organization imposed thereon.

A large data storage array is an illustrative example. A traditional storage array (herein also referred to as a "disk storage array", "disk array", or simply "array") is a collection of storage entities, such as hard disk drives, solid state drives, tape drives, or other entities used to store information (for simplicity, hereinafter referred to as "disks"), operating together logically as a unified storage device. A storage array may be thought of as a system for managing a large amount of a resource, i.e., a large number of disk sectors. Management of the resource may include allocation of a portion the resource in response to allocation requests. In the storage array example, portions of the storage array may be allocated to, i.e., exclusively used by, entities that request such allocation. One issue that may be considered during allocation of a resource is the selection process—namely, how to determine which unallocated portion of the collection of resources is to be allocated to the requesting entity.

Conventional allocation methods fall into two categories: allocation methods that use naive algorithms, i.e., algorithms that do not consider the organization or underlying characteristics and constraints of the resources, and allocation methods that use ad hoc algorithms, i.e., algorithms that are designed for a particular end or case at hand without consideration of the wider application. Both types of algorithms have disadvantages: because naive algorithms don't consider the current use of resources, they tend to make inefficient use of those resources, while ad hoc algorithms are usually rigid and inflexible, and tend to be hard-coded, making them difficult to modify. Using the storage array example above, a naive algorithm may simply allocate a portion of the storage array without considering bus. RAID group, or LU capacity/occupancy. An ad hoc algorithm may consider these parameters, but the algorithm must be customized for the particulars of the resources to be managed, and once defined, may not be subsequently modified.

Accordingly, there exists a need to manage system resources in a non-naive manner, but without the rigidity of conventional ad hoc implementations. Specifically, there exists a need for methods, systems, and computer readable medium for dynamic, policy-based allocation of system resources.

SUMMARY

According to one aspect, the subject matter described herein includes a method for dynamic, policy-based allocation of system resources. The method includes specifying a plurality of system resource collections for representing sets of like system resources and their dependencies. An order in which the collections are to be evaluated during selection of a resource is also specified. A policy for determining the best resource within each collection is also specified. Statistics about the system resources in the collections are maintained. A request for a resource is received. In response to receiving the request, the collections are evaluated in the specified order. The best resource is selected from each collection based on the dependencies, prior selections, and statistics to implement the policy.

According to another aspect, the subject matter described herein includes a system for dynamic, policy-based allocation of system resources. The system includes a plurality of system resources of different types, organized into a plurality of collections of like resources. The system also includes a resource manager, which receives, from a requesting entity, a request for allocation of a resource. In response to receiving the request, the resource manager selects the best resource based on statistics about the system resources, dependencies of the resource collections, prior selections, and a policy for determining the best resource from each collection.

The subject matter described herein for dynamic, policy-based allocation of system resources may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer perform steps.

Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable medium are provided for dynamic, policy-based allocation of system resources. In one embodiment, the user or administrator of a system for managing particular system resources creates a set of rules that define sets of resources and their dependencies in a generic way, and these rules are used by a resource manager function to select and allocate a resource in response to an allocation request. By describing sets or collections of resources, the relationships between collections, and the constraints associated with the collections and relationships in a generic way, then it is possible to provide a resource manager that allocates and manages resources in a non-naive, dynamic manner without the rigidity of ad hoc implementations. Furthermore, the resource manager would not required to know the details of any collection in order to select a resource.

As used herein, a "resource" is a physical or logical resource of the system to be managed, and a "resource object" is a data construct or other abstraction used to represent a specific instance of a resource. Examples of physical resources include processors, buses, memories or portions of memories, storage entities or portions thereof. Examples of logical resources include accounts, users, quotas, permissions, access control lists, account balances, and timeslots.

As used herein, a "resource collection" or "collection" is a set of resources of the same type, and a "collection object" is a data construct or other abstraction used to represent the collection. A collection object may include or point to a set of resource objects. A collection object may export interfaces to add, remove, search, and enumerate resource objects.

As used herein, an "interface" is a predefined mechanism by which certain functions or tasks are performed. For example, an interface may be a function, subroutine, class method, and the like. The interface abstraction is used so that the underlying manner of manipulating the objects is hidden from the entity that uses the interface, e.g., invokes the function or method. This gives flexibility, allowing a change of how the objects are stored, e.g., lists, hash tables, b-trees, etc., without any external changes.

Figure 1A:
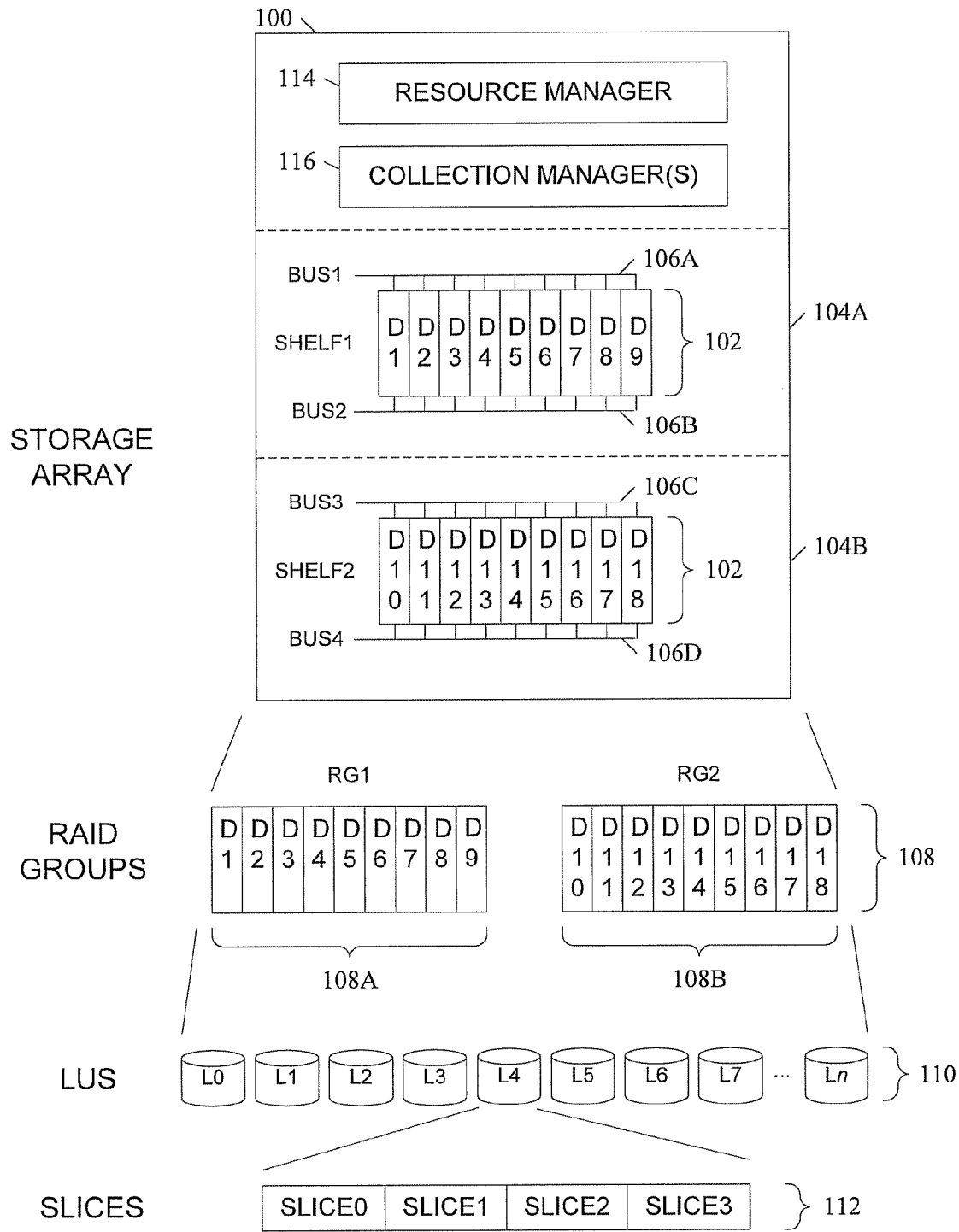
FIG. 1A is a block diagram illustrating an exemplary system for dynamic, policy-based allocation of system resources according to an embodiment of the subject matter described herein.

FIG. 1A is a block diagram illustrating an exemplary system for dynamic, policy-based allocation of system resources according to an embodiment of the subject matter described herein. The embodiment illustrated in FIG. 1A is a data storage array, but management of other kinds of systems or system resources is also within the scope of the subject matter claimed.

Although the atomic unit of resource being allocated may be a single disk sector, for example, the collective resource known as the "storage array" may be organized into a hierarchical set of collections: disks may be logically and/or electrically divided into "disks that are connected to one bus" and "disks that are connected to another bus"; disks may be grouped into RAID (redundant array of inexpensive disks) groups; RAID groups may be divided into logical units, or LUs; LUs may be subdivided into portions hereinafter referred to as "slices"; slices may be subdivided also, and so on. If the system is designed such that each disk is connected to only one bus, and each bus is managed by a separate processor, for example, the natural boundary of physical connection to one bus or another dictates that the organizational structure of a RAID group be constrained to one bus, e.g., that a RAID group cannot span multiple buses. The organizational structure of an LU may be similarly constrained, e.g., that an LU cannot span multiple RAID groups. In this example, the high level abstraction of a RAID group allows a collection of individual disks to be treated as a single, large disk, an abstraction that simplifies management of that collection of disks.

Storage array 100 includes multiple storage devices 102, which are typically hard disk drives, but which may be tape drives, flash memory, flash drives, other solid state drives, or some combination of the above. In one embodiment, the storage devices may be organized into multiple shelves 104, each shelf containing multiple devices 102. In the embodiment illustrated in FIG. 1A, storage array 100 includes two shelves, Shelf1 104A and Shelf2 104B; Shelf1 104A contains nine storage devices, D1-D9, and Shelf2 also contains nine storage devices, D10-D18. In one embodiment, each storage device 102 may be connected to one or more buses 106. In the embodiment illustrated in FIG. 1A, each shelf 104 has two buses 106 which connect to every device 102 on that shelf 104. For example, Shelf1 104A has two buses, Bus1 106A and Bus2 106B, both of which are connected to devices D1-D9. Similarly, Shelf2 104B has two buses. Bus3 106C and Bus4 106D, both of which are connected to devices D10-D18. The configuration of storage array 100 as illustrated in FIG. 1A is for illustrative purposes only, and is not to be considered a limitation of the subject matter described herein.

In addition to the physical configuration, storage devices 102 may also be logically configured. For example, multiple storage devices 102 may be organized into redundant array of inexpensive disks (RAID) groups; or RGs 108, shown in FIG. 1A as RG1 108A and RG2 108B. Storage devices D1-D9 are organized into a first RAID group, RG1 108A, while storage devices D10-D18 are organized into a second RAID group, RG2 108B. In one embodiment, a RAID group may span multiple shelves and/or multiple buses. Although RAID groups are composed of multiple storage devices, a RAID group may be conceptually treated as if it were a single storage device.

As used herein, the term "storage entity" may refer to either a single storage device or a RAID group operating as a single storage device. Storage entities may be further sub-divided into logical units. A single RAID group or individual storage device may contain one or more logical units (LUs) 110. In the embodiment illustrated in FIG. 1A, RAID groups 108 have been collectively subdivided into multiple LUs 110, L0 through Ln. For example, RG1 108A may have been divided into LUs L0-L6 while RG2 108B may have been divided into LUs L7-Ln. Each logical unit 110 may be further subdivided into portions of a logical unit, referred to as "slices" 112. In the embodiment illustrated in FIG. 1A, L4 has been divided into four slices 112. SLICE0-SLICE3.

As described above, depending upon the physical characteristics of the system, the collections of resources may have physical, electrical, or logical constraints on their use. Using the embodiment illustrated in FIG. 1A, for example, a RAID group 108 may span more than one shelf 104 if the RAID controller is connected to at least one bus 106 on both shelves 104; if the RAID controller is associated with only one bus 106, or with buses 106 of only one shelf 104, a RAID group 108 cannot span multiple shelves 104. Similarly, an LU 110 may or may not span multiple storage entities, depending on the configuration of storage array 100.

As this example illustrates, system resources can be organized into collections: array 100 contains a collection of shelves 104; each shelf 104 contains a collection of buses 106 and storage entities 102; each bus 106 is connected to a collection of storage entities 102; each storage entity 102 contains a collection of LUs 110; and each LU 110 contains a collection of slices 112. Each collection of resources may have an association with other collections of resources: for example, each shelf is associated with specific buses and specific devices. If these collections, the relationships between collections, and the constraints associated with the collections and relationships, can be described in a generic way, then it is possible to provide a resource manager 114 that allocates and manages resources in a non-naive, dynamic manner without the rigidity of ad hoc implementations. In one embodiment, array 100 may include one or more collection managers 118, which are responsible for managing collections of resources, and which interact with resource manager 114 to provide services to or perform functions on behalf of resource manager 114.

Figure 1B:
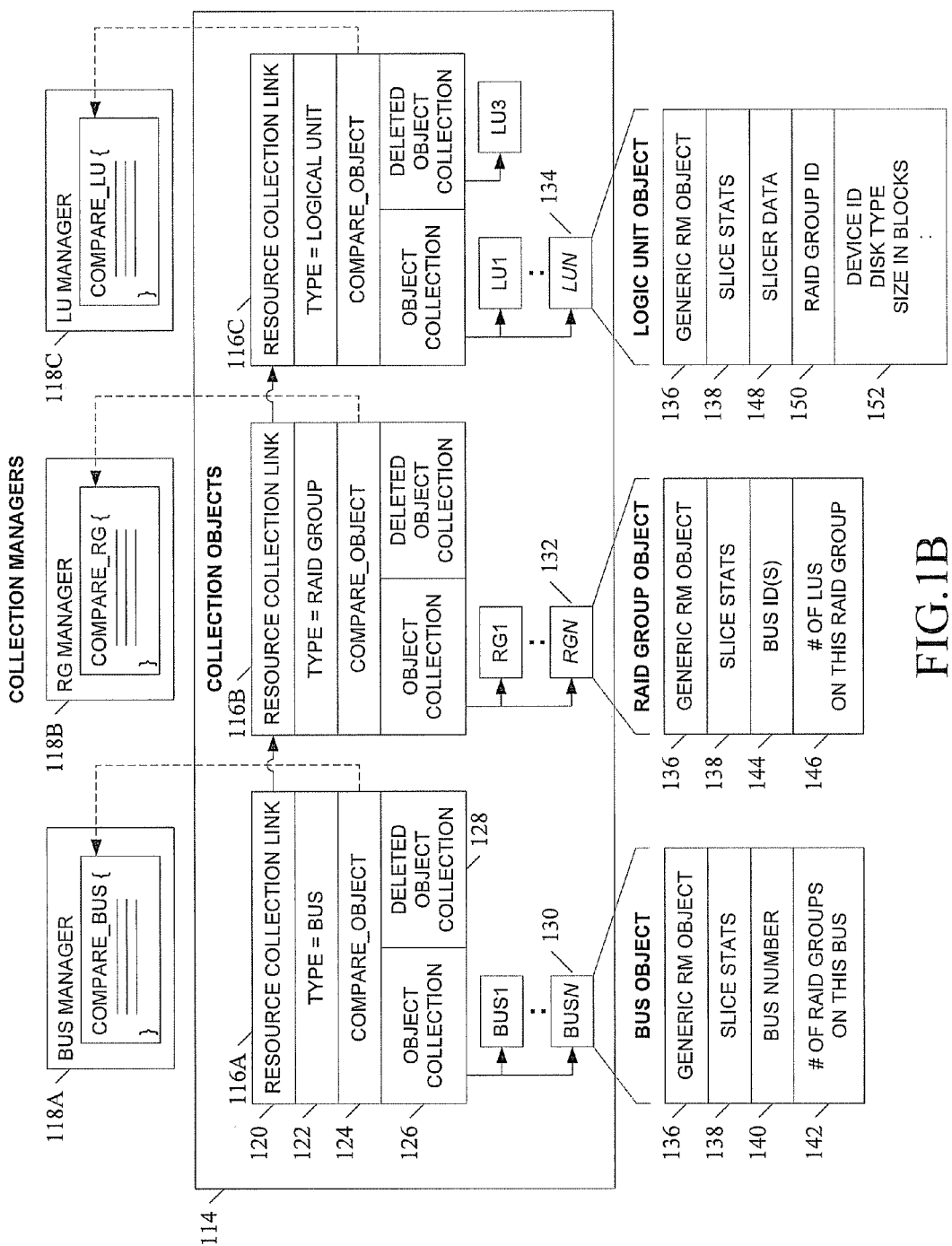
FIG. 1B is a block diagram illustrating an exemplary resource manager for dynamic, policy-based allocation of system resources according to an embodiment of the subject matter described herein.

FIG. 1B is a block diagram illustrating an exemplary resource manager for dynamic, policy-based allocation of system resources according to an embodiment of the subject matter described herein. In one embodiment, clients of resource manager 114 may create any number of generic collections of resources, e.g., sets of similar objects, and specify the order in which the collections will be accessed. The order specified may connote a dependency or other relationship between one type of resource and another type of resource. In the embodiment illustrated in FIG. 1B, resource manager 114 makes use of at least one generic data object, resource collection object 118, for representing a collection of resources.

Each collection object 118 may include a resource-manager-defined set of generic interfaces. Although the interfaces are predefined by the resource manager, the operations performed by each interface are defined by a collection manager 116 for managing a particular type of resource object. For example, resource manager 114 may require that each resource collection object 118 include an interface called "COMPARE_OBJECT", which resource manager 114 uses to compare two resources in the collection (or, more specifically, to compare two resource objects representing those two resources). However, how the comparison is performed and what standards are used to determine which is the better object, is controlled by collection manager 116, not by resource manager 118. By defining the collections of resources in a generic way, resource manager 114 is not required to know the details of any collection in order to select a resource. Instead, resource manager 114 need only walk through the collection objects 118, using collection object 118 interfaces to select from among the individual members of each collection. The same principle to perform other operations. For example, each collection manager 116 may be responsible for creating an new resource object at the request of resource manager 114. In that scenario, collection object 118 may include an additional interface, such as a CREATE_OBJECT interface, which invokes an appropriate function within the respective collection manager 116. For example, a CREATE_OBJECT interface on RAID group collection object 118B may invoke a CREATE_RG function within RAID group collection manager 116B.

In one embodiment, the collection objects 118 may be organized as a linked list, where the order of the objects in the list determines the order that resource manager 114 analyzes the respective collections, which may also represent or determine the relative priorities of the objects in the selection process. For example, in the embodiment illustrated in FIG. 1B, there are three collections of resources: buses, RAID groups, and logical units. Each collection object 118 contains a pointer, called a resource collection link 120, to the next collection object 118. Thus, resource manager 114 may walk through the bus, RAID group, and logical unit collection objects 118 in order, and in this manner first select a bus, then select a RAID group that occupies the selected bus, then select a logical unit from the selected RAID group.

In one embodiment, the results of the selection of one resource will influence the subsequent selection: once a bus is selected, all RAID groups that occupy other buses may be disqualified or excluded from the subsequent RAID group selection process. Similarly, once a RAID group is selected, all logical units that occupy other RAID groups may be disqualified or excluded from the logical unit selection process.

In one embodiment, the collection object 118 may include a type indicator 122 (e.g., type=bus) for identifying the type of resource represented by the collection object; a COMPARE_OBJECT 124 interface, which is a mechanism for comparing objects in the collection; and a collection of created objects 126. Collection object 118 may include a collection of deleted objects 128, used to store objects marked for eventual deletion or destruction but whose deletion is pending because the object is still referenced by another object. For example, a RAID group may be decommissioned by the storage array administrator, but the RAID group object cannot be deleted until all logical units within the RAID group are decommissioned. In that scenario, the decommissioned RAID group object would be placed into the collection of deleted objects 128.

In one embodiment, the collections of created and/or deleted objects associated with collection object 118 may be organized as a table, a linked list, or other data structures and relationships known in the art. In the embodiment illustrated in FIG. 1B, bus collection object 118A maintains a list of bus objects 130, RAID group collection object 118B maintains a list of RAID group objects 132, and logical unit collection object 118C maintains a list of logical unit objects 134.

Each resource in a collection may be represented by a resource object. In one embodiment, each resource object in a resource collection must be, at least in some aspect, the same as all other resource objects in the same collection as well as all resource objects in other collections. This may be done by defining a generic object data structure common to all resource objects. In one embodiment, each resource object contains an object type for identifying the type of resource represented by the resource object. A resource object may include a resource object identifier, a resource identifier, and a reference associating the resource object to one or more resource collections.

In the embodiment illustrated in FIGS. 1A and 1B, the resources to be allocated are slices of the storage array. Slices are portions of logical units, logical units are portions of RAID groups, and RAID groups occupy one or more buses. Thus, in this example, there are three types of resource objects: bus objects 130, RAID group objects 132, and logical unit objects 134. In one embodiment, each resource object may include a header 136 identifying the data structure as a generic resource manager (RM) object and slice statistics 138 indicating how many total slices exist within that resource, how many of the total slices are allocated, etc. In alternative embodiments, slice statistics 138 may be data stored within the resource object, a pointer to slice statistics stored elsewhere, or a function call to a slice statistics manager that provides this information, for example.

Each resource object may also include information pertinent only to that type of resource. For example, bus object 130 may include bus number 140, and information indicating the number of raid groups on the bus 142. RAID group object 132 may include information indicating which bus or buses the RAID group occupies and the number of logical units within the RAID group. Logical unit object 134 may include slice information 148, such as a slice allocation table (SAT); RAID group ID 150; and device information 152, such as device ID, disk type, size in blocks, etc.

The order that the resource collections are to be analyzed and the determination of what makes the "best" slice to be selected may be dictated by the particular policy implemented by the client. The policy determines the selection process, and the selection process implements the policy.

For example, a "low power" policy may seek to allocate slices only from one storage entity until that storage entity is fully utilized before allocating slices from another storage entity, to reduce power consumption. Under this policy, a bus that is connected to devices that already have slice allocations, and thus bus traffic, is a "better" selection than a bus that has no traffic. Similarly, a RAID group currently in use but not yet filled to capacity is preferred over a RAID group currently not in use.

Alternatively, in a "high performance" policy, the client may desire to maximize throughput by evenly distributing slices across all physical disks in a disk storage array. Under this policy, an empty bus will be selected over a bus currently bearing traffic, and an RAID group from which no slices have been allocated will be preferred over a RAID group already containing allocated slices.

Thus, COMPARE_OBJECT 124 interfaces for logical unit, RAID group, and bus may return different results when implementing a high performance policy than when implementing a low power policy. The resource selected is the "best" resource according to the policy implemented. Example implementations of these two policies are disclosed in commonly assigned, co-pending U.S. patent application Ser. No. 12/100,514, filed Apr. 10, 2008, the disclosure of which is incorporated by reference herein in its entirety. In one embodiment, the policy is considered by collection managers 116. For example, the COMPARE_LU function within logical unit collection manager 116C may include, make reference to, or have passed in as an argument a policy indicator.

Having collection managers 116 define the compare functions provides several benefits: the implementation of resource manager 114 may be simplified; additional resource types may be easily added for consideration by resource manager 114 without having to modify resource manager 114; and the determination of what makes a best resource for selection may be changed, also without having to modify resource manager 114.

Figure 2:
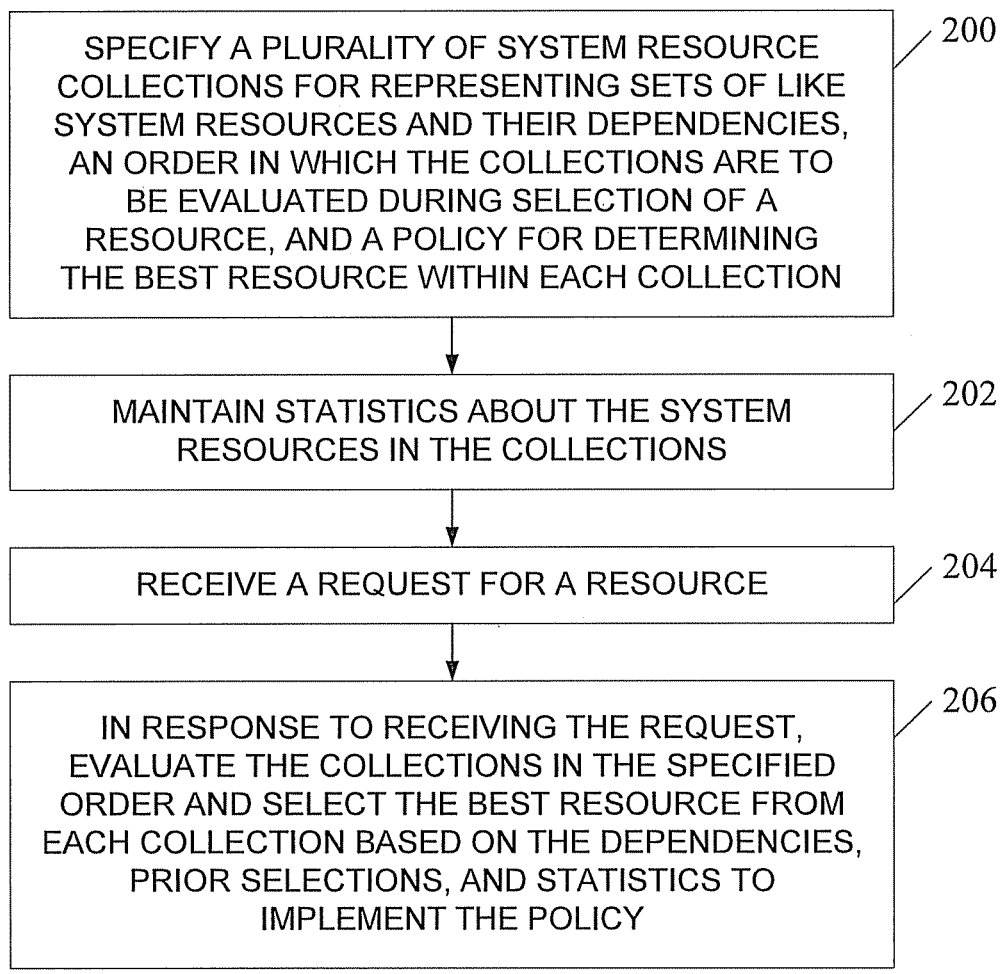
FIG. 2 is a flow chart illustrating an exemplary process for dynamic, policy-based allocation of system resources according to an embodiment of the subject matter described herein.

FIG. 2 is a flow chart illustrating an exemplary process for dynamic, policy-based allocation of system resources according to an embodiment of the subject matter described herein. This process will herein be described with reference to FIGS. 1A, 1B, and 2.

At block 200, a plurality of system resource collections for representing sets of like system resources and their dependencies is specified, along with an order in which the collections are to be evaluated during selection of a resource, and a policy for determining the best resource within each collection. For example, resource manager 114 may maintain a set of collection objects 118 representing collections of like resources. In the embodiment illustrated in FIG. 1B, resource manager resource manager 114 maintains a linked list of collection objects 118A through 118C in that order.

At block 202, statistics about the system resources represented in the collections are maintained. In one embodiment, each resource object may include information pertinent to the selection process. In the embodiment illustrated in FIG. 1A, bus object 130, RAID group object 132, and logical unit object 134 each maintain slice statistics 138. For example, bus object 130 may keep track of how many slices have been allocated from storage entities that are connected to each bus. Similarly, RAID group object 132 may keep track of the number of slices that it contains, the number of slices that have been allocated, the number of slices that are unallocated, and so on. In one embodiment, RAID group object 132 may keep track of the buses to which the RAID group has physically connected or logically associated. Logic unit object 134 may also include slice statistics.

At block 204, a request for a resource is received. In the embodiment illustrated in FIG. 1A, storage array 100 may receive a request from a requesting entity, such as a host, that a slice 112 or other portion of data storage be allocated to the requesting entity.

At block 206, in response to receiving the request, the collections are evaluated in the specified order, and the best resource is selected from each collection. The determination of what makes a best resource is based a consideration of the resource dependencies and statistics in light of the policy.

A generic description of the selection process might include the following steps:
1. Receive an allocation request.
2. In response to the request, go to highest priority or first resource collection, such as the first resource collection in a linked list of resource collections.
3. Determine if there are two or more resource objects in the collection. If not, select the one resource object in the collection and go to step 4. If so, select two and perform the compare operation using the two selected objects. Repeat performing the compare operation using the winner of previous compare and the next object in list, until all objects in the collection have been compared, resulting in an object selected from the collection.
4. Go to the next resource collection; exclude from consideration all objects that are not associated with selected resource from the first comparison.
5. Repeat steps 3 and 4 until all collections have been processed.

A brief example is provided here. In the embodiment illustrated in FIGS. 1A and 1B, each logical unit belongs to a RAID group, and each RAID group is comprised of a set of disks that live on a back-end bus. The buses, RAID groups, and logical units are modeled as resource collections. An example selection process is shown below:

1) Select a Bus.

Resource manager 114 starts at the first resource collection, which in this example is bus collection 118A. Resource manager 114 does not need to know what type of collection it is processing; resource manager 114 simply makes calls to the standard interfaces. Resource manager 114 walks through each bus object 130 in bus collection 118A. The best bus from among available buses is determined by using COMPARE_OBJECT standard interface 124. In the embodiment illustrated in FIG. 1B, the COMPARE_OBJECT interface 124 is a reference to or otherwise invokes the COMPARE_BUS function within bus manager 118A.

2) Select a RAID Group.

Resource manager 114 moves to the next resource collection, which in this example is RAID group collection 118B. Again, resource manager 114 does not need to know what type of collection it is processing, but simply makes calls to the standard interfaces. Resource manager 114 walks through each RAID group object 132, using COMPARE_OBJECT standard interface 124 to determine the best RAID group. In the embodiment illustrated in FIG. 1B, the COMPARE_OBJECT interface 124 is a reference to or otherwise invokes the COMPARE_RG function within RG manager 118B. The selection process may consider an object that was selected in a previous search, e.g., to make sure to select a RAID group that contains a disk on the previously selected bus, or to exclude from consideration all RAID groups that do not occupy the selected bus. The selection process may consider a selection policy to interpret per-object statistics and make the best selection in light of the current policy goals.

3) Select a Logical Unit.

Resource manager 114 moves to the next resource collection, which in this example is logical unit collection 118C. Resource manager 114 walks through each logical unit object 134, using the COMPARE_OBJECT standard interface 124, ultimately selecting the best logical unit. In the embodiment illustrated in FIG. 18, the COMPARE_OBJECT interface 124 is a reference to or otherwise invokes the COMPARE_LU function within LU manager 118C. The selection process considers the object or objects selected in previous selection processes, e.g., to consider only logical units that exist on the selected RAID group.

In this example, the selection process ends with the selection of a logical unit. However, additional selection steps may be performed, such as the selection of a slice within the logical unit, selection of a portion of the slice, and so on.

Since resource manager 114 doesn't know the details of the individual collections, this process is greatly simplified, as illustrated in the pseudo-code program shown below:

```
1.    repeat
2.       RC = GetNextRsrcCollection( );
3.       prevRsrc = resource;
4.       resource = RC.GetBestRsrcObj (prevRsrc, policy);
5.    until (noMoreCollections);
6.    return resource;
```

Lines 1 through 5 define a program loop that performs some operation on collection objects 118 until all collection objects 118 have been processed. In line 2, a GetNextResourceCollection function returns RC, a pointer to a resource collection object. In line 3, the previous resource returned by a prior selection process (if there was one) is saved as prevRsrc. In line 4, a resource manager method, GetBestRsrcObj, is invoked. The previously selected resource, "prevRsrc", and a pointer to the current policy, "policy", are passed to the method as parameters or arguments. In one embodiment, resource manager 114 function GetBestRsrcObj walks through the generic objects in the collection, directly calling the comparison routine specific to that collection to choose the better of two objects in the collection, until all objects in the collection have been compared. The GetBestRsrcObj method may then return a pointer to the selected resource within collection RC. In line 6, the program ends, returning a pointer to (i.e., indicating to the requesting entity) the selected resource.

As can be seen in the pseudo-code listed above, resource manager 114 goes through the available generic resource collections, invoking its standard function GetBestRsrcObj, which in turn uses each collection's generic comparison function, via a call to the COMPARE_OBJECT interface, to find and return the best resource from that collection, until all collections have been processed. Once a selection has been made from the last collection, the process is over. By modeling resources in this way, it is easy to add resources to or remove resources from the selection process. Thus, the selection process could be used to select from among any conceivable set of interdependent resources with no changes to resource manager 114.

Resource manager 114 may include interfaces for performing a variety of tasks, such as adding or removing resource collections to the set of resource collections about which resource manager 114 maintains information; changing the order in which resource collections are evaluated by the resource manager; adding or removing resource objects from the resource collections; changing the order of the resource objects maintained in each resource collection; and selecting a resource from within the collection. In one embodiment, the selection process walks through the list of resource objects, starting with the first two resource objects in the list, and compares the two objects to determine which object is the better of the two. The winner of the comparison—i.e., the "better" object—is then compared against the next object within collection; this operation repeats until all objects in the collection have been subjected to a comparison operation. The object remaining after all comparisons are complete is the "best" object.

Thus, resource manager 114 may maintain a list, table, database, or other means for storing a set of collection objects 118, the number of resource collections currently maintained, information indicating the order in which the resource collections should be evaluated, or other information helpful to the selection process.

In one embodiment, the comparison operation is performed by resource manager 114, but the comparison operation is defined by the client. For example, system 100 may include a dedicated memory for holding client-created routines, in which case the comparison interface 128 may include a pointer to the memory location where resource manager 114 can expect to find the comparison function or routine. Alternatively, system 100 may include separate entities, called collection managers, which perform the comparison operation upon request from resource manager 114 and which send the results of the comparison operation back to resource manager 114. In this scenario, resource manager 114 may simply iterate through its list of resource objects, choosing two or more objects from the list, and ask the resource manager to select the best object.

In one embodiment, the selection of the best resource object in a resource collection may involve considering any dependencies or other selection criteria, including the results of a previous selection. For example, in the embodiment illustrated in FIG. 1A, each RAID group 108 may be associated with one or more buses; if the selection process first chooses the best bus, then the best RAID group, for example, once the best bus has been selected, all RAID groups not on the selected bus must be excluded from selection during the next step of the selection process, the selection of the best RAID group. If the selection policy is generally "choose a slice from the RAID group with the highest throughput", the "best" RAID group might not be simply "the highest throughput RAID group", for example, but might be "the highest throughput RAID group that is attached to the selected bus."

It will be understood that various details of the subject matter described herein may be changed without departing from the scope of the subject matter described herein. Furthermore, the foregoing description is for the purpose of illustration only, and not for the purpose of limitation.

What is claimed is:

1. A method for dynamic, policy-based allocation of system resources, the method comprising:
   specifying a plurality of system resource collections for representing sets of like system resources and their dependencies, an order in which the collections are to be evaluated during selection of a resource, and a policy for determining the best resource within each collection, wherein the system resources include resources of a storage array including a plurality of storage entities for storing data and a plurality of system buses for transferring data to and from the plurality of storage entities;
   maintaining statistics about the system resources in the collections, wherein the statistics include a number of allocated slices associated with each of the plurality of system buses;
   receiving, from a requesting entity, a request for allocation of a resource; and
   in response to receiving the request, evaluating the collections in the specified order and selecting a best resource from each collection based on the dependencies, prior selections, and statistics to implement the policy.

2. The method of claim 1 comprising allocating the selected resource to the requesting entity.

3. The method of claim 1 comprising providing a resource manager for receiving the request, evaluating the collections, and selecting the best resource from each collection.

4. The method of claim 3 comprising providing a collection manager for managing a collection of resources and for receiving, from the resource manager, requests to evaluate resources within the managed collection and indicate to the resource manager the best resource within the managed collection.

5. The method of claim 1 wherein the storage entities are divided into at least one logical unit, and wherein the at least one logical unit is divided into at least one slice.

6. The method of claim 5 wherein each storage entity comprises one of a single storage device and a plurality of storage devices organized into a redundant array, and wherein each storage device comprises one of: a hard disk drive; a floppy disk drive; a tape drive; a solid state drive; a flash memory; and a flash drive.

7. The method of claim 6 wherein the redundant array comprises a redundant array of inexpensive disks (RAID) group.

8. The method of claim 5 wherein the plurality of system resource collections includes at least one of: a collection of system buses; a collection of storage entities; a collection of logical units; and a collection of slices.

9. The method of claim 5 wherein the statistics include at least one of: a number of slices allocated from each storage entity; and a number of slices allocated from the at least one logical unit.

10. The method of claim 9 wherein selecting a best resource from each collection comprises excluding a resource within the collection from consideration for selection, the excluding being based on a relationship between a statistic associated with the excluded resource and a threshold.

11. The method of claim 1 wherein collections of resources are represented by collection object data structures and wherein the collection objects are organized into a linked list.

12. The method of claim 11 wherein resource instances are represented by resource object data structures and wherein each resource object is associated with a collection object.

13. A system for dynamic, policy-based allocations of system resources, the system comprising:
   a plurality of system resources of different types, organized into a plurality of collections of like resources, wherein the system resources include resources of a storage array including a plurality of storage entities for storing data and a plurality of system buses for transferring data to and from the plurality of storage entities; and
   a resource manager for receiving, from a requesting entity, a request for allocation of a resource, and, in response to receiving the request, selecting the best resource based on statistics about the system resources, dependencies of the resource collections, prior selections, and a policy for determining the best resource from each collection, wherein the statistics include a number of allocated slices associated with each of the plurality of system buses.

14. The system of claim 13 wherein the selected resource is allocated to the requesting entity.

15. The system of claim 13 comprising individual resource collection managers, each for managing a collection of resources and for receiving, from the resource manager, requests to evaluate resources within the managed collection and indicate to the resource manager the best resource within the managed collection.

16. The system of claim 13 wherein the storage entities are divided into at least one logical unit, and wherein the at least one logical unit is divided into at least one slice.

17. The system of claim 13 wherein each storage entity comprises one of a single storage device and a plurality of storage devices organized into a redundant array, and wherein each storage device comprises one of: a hard disk drive; a floppy disk drive; a tape drive; a solid state drive; a flash memory; and a flash drive.

18. The system of claim 17 wherein the redundant array comprises a redundant array of inexpensive disks (RAID) group.

19. The system of claim 13 wherein the plurality of system resource collections includes at least one of: a collection of storage entities; a collection of logical units; and a collection of slices.

20. The system of claim 13 wherein the statistics include at least one of: a number of slices allocated from each storage entity; and a number of slices allocated from the at least one logical unit.

21. The system of claim 13 wherein selecting, by the resource manager, a best resource from each collection comprises excluding a resource within the collection from consideration for selection, the excluding being based on a relationship between a statistic associated with the excluded resource and a threshold.

22. The system of claim 13 wherein collections of resources are represented by collection object data structures and wherein the collection objects are organized into a linked list.

23. The system of claim 22 wherein resource instances are represented by resource object data structures and wherein each resource object is associated with a collection object.

24. A non-transitory computer readable medium having stored thereon computer executable instructions that when executed by the processor of a computer perform steps comprising:
   specifying a plurality of system resource collections for representing sets of like system resources and their dependencies, an order in which the collections are to be evaluated during selection of a resource, and a policy for determining the best resource within each collection, wherein the system resources include resources of a storage array including a plurality of storage entities for storing data and a plurality of system buses for transferring data to and from the plurality of storage entities;

maintaining statistics about the system resources in the collections, wherein the statistics include a number of allocated slices associated with each of the plurality of system buses;

receiving a request for a resource; and in response to receiving the request, evaluating the collections in the specified order and selecting the best resource from each collection based on the dependencies, prior selections, and statistics to implement the policy.

\* \* \* \* \*